United States Patent
Woodall

(10) Patent No.: US 12,266,084 B2
(45) Date of Patent: Apr. 1, 2025

(54) METHODS AND SYSTEMS FOR IMPROVING A QUALITY OF DIGITAL IMAGES

(71) Applicant: Pixelworks Semiconductor Technology (Shanghai) Co., Ltd., Shanghai (CN)

(72) Inventor: Neil Woodall, Newport Beach, CA (US)

(73) Assignee: PIXELWORKS SEMICONDUCTOR TECHNOLOGY (SHANGHAI) CO. LTD., Shanghai (CN)

( * ) Notice: Subject to any disclaimer, the term of this patent is extended or adjusted under 35 U.S.C. 154(b) by 618 days.

(21) Appl. No.: 17/451,252

(22) Filed: Oct. 18, 2021

(65) Prior Publication Data

US 2023/0117976 A1   Apr. 20, 2023

(51) Int. Cl.
*G06T 5/40* (2006.01)
*G06T 3/4053* (2024.01)
*G06T 5/20* (2006.01)
*G06T 5/92* (2024.01)

(52) U.S. Cl.
CPC .............. *G06T 5/40* (2013.01); *G06T 3/4053* (2013.01); *G06T 5/20* (2013.01); *G06T 5/92* (2024.01); *G06T 2207/20072* (2013.01)

(58) Field of Classification Search
CPC ........... G06T 5/40; G06T 3/4053; G06T 5/20; G06T 5/92; G06T 2207/20072
See application file for complete search history.

(56) References Cited

U.S. PATENT DOCUMENTS

| | | | |
|---|---|---|---|
| 2013/0039577 A1* | 2/2013 | Chiu | G06T 5/92 382/169 |
| 2016/0205405 A1* | 7/2016 | Ten | G06T 5/50 382/166 |
| 2022/0284543 A1* | 9/2022 | Jo | G06T 5/40 |

* cited by examiner

*Primary Examiner* — Chan S Park
*Assistant Examiner* — Daniel C Chang
(74) *Attorney, Agent, or Firm* — McCoy Russell LLP

(57) ABSTRACT

Various methods and systems are provided for increasing an efficiency of operations for improving digital image quality. In an embodiment, a method for processing a digital image includes generating a higher resolution histogram from the digital image, the higher resolution histogram generated from a lower resolution histogram of raw image data of the digital image, filtering the higher resolution histogram, downsampling the filtered, higher resolution histogram to form a downsampled histogram, generating one or more picture quality adjustments based on the downsampled histogram, applying the one or more picture quality adjustments to the raw image data of the digital image to generate an improved digital image, the improved digital image having a higher picture quality than the digital image, and displaying the improved digital image on a display device.

10 Claims, 9 Drawing Sheets

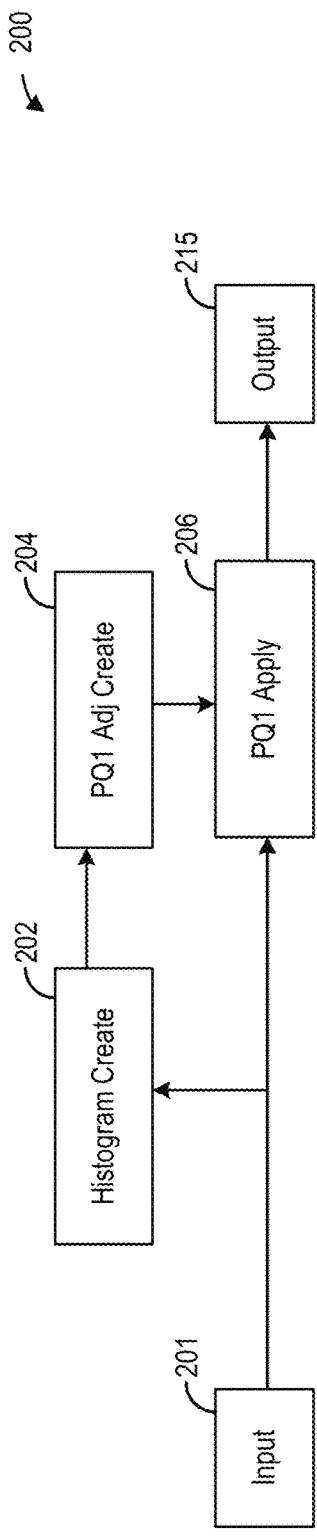
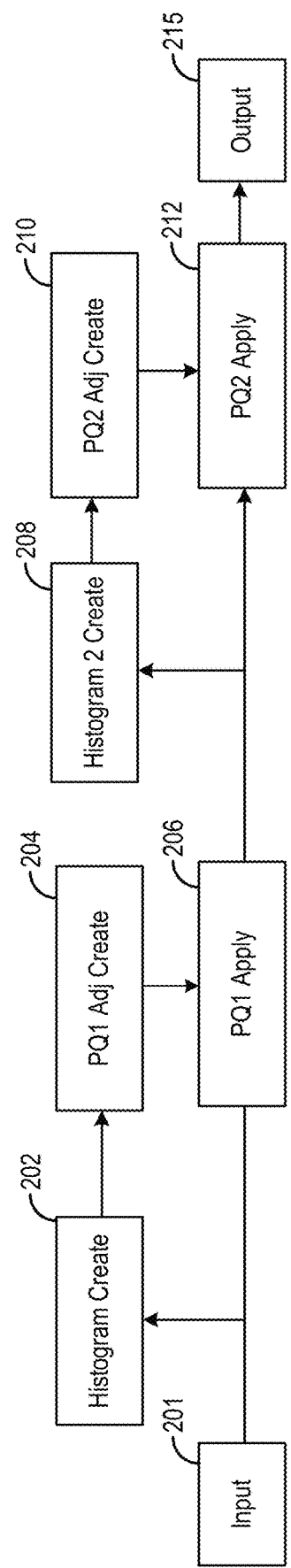
FIG. 2A PRIOR ART
FIG. 2B

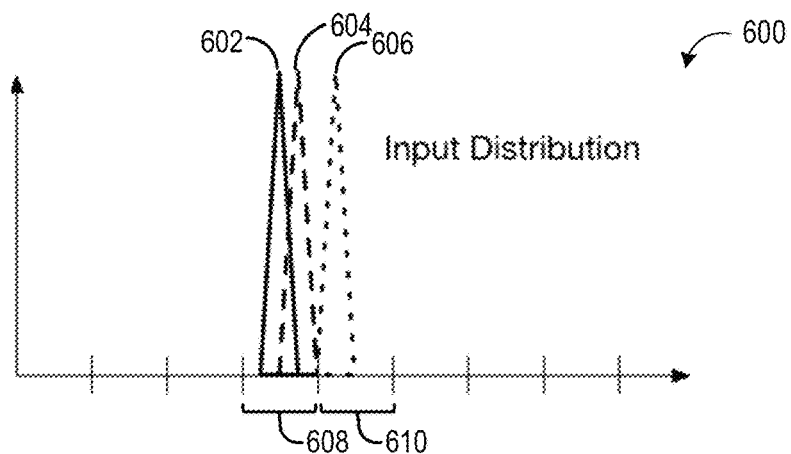
FIG. 6A
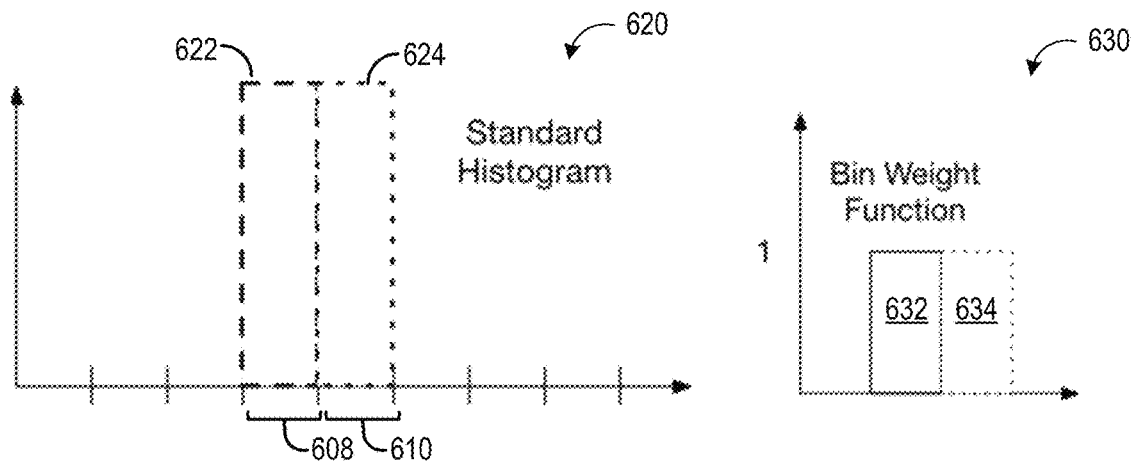
FIG. 6B
FIG. 6C
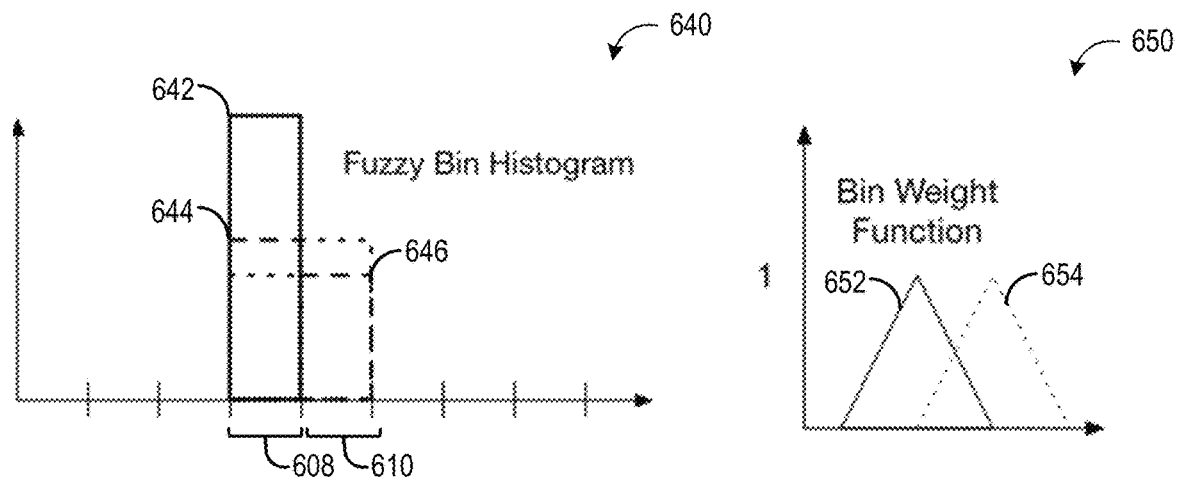
FIG. 6D
FIG. 6E

METHODS AND SYSTEMS FOR IMPROVING A QUALITY OF DIGITAL IMAGES

FIELD

Embodiments of the subject matter disclosed herein relate to image processing, and in particular, improving a picture quality of digital images.

BACKGROUND

Processing a digital image for display may include various picture quality improvement processes, such as tone mapping. When a sequence of digital images is processed for display, a tone mapping algorithm may be applied to each image of the sequence of digital images. The tone mapping algorithm may take as input a distribution of pixel intensity values of a digital image, as represented in an image histogram (also referred to herein as a histogram) of the digital image, and may output an adjustment to be made to the pixel intensity values of the image to generate an improved image for display.

However, the tone mapping algorithm may be sensitive to small changes in image data, based on how histogram data is collected. For example, pixels from large areas of the same color of consecutive image frames may be alternately allocated to a one bin of a first histogram of a first image frame, and a different bin of a second histogram of a second image frame, due to variances in color. This may result in visual artifacts, such as flashing. One approach to resolving this issue is to treat assignment of a pixel to a bin of a histogram as a fuzzy set, where the pixel may be divided between two bins of a histogram if the pixel is close to an edge of a bin. However, while this may resolve some visual artifact issues, the distribution may now look different depending on where in a given bin pixels fall, leading to inconsistent results. A related problem is that adding image processing steps in between histogram generation may increase the latency in image display.

BRIEF DESCRIPTION

In one embodiment, the issues described above may be at least partially addressed by a method for processing a digital image including generating a higher resolution histogram from the digital image, the higher resolution histogram generated from a lower resolution histogram of raw image data of the digital image, filtering the higher resolution histogram, downsampling the filtered, higher resolution histogram to form a downsampled histogram, generating one or more picture quality adjustments based on the downsampled histogram, applying the one or more picture quality adjustments to the raw image data of the digital image to generate an improved digital image, the improved digital image having a higher picture quality than the digital image, and displaying the improved digital image on a display device. By increasing a stability of the image histogram used by the image processing operations as described herein, the same image histogram may be used as input into the plurality of picture quality adjustments, and additional histograms may not need to be generated from the input image data for each picture quality adjustment to be applied. As a result, a latency in displaying the improved digital image may be reduced. In this way, various picture quality improvement algorithms may be efficiently combined during image processing in a way that reduces visual artifacts without increasing the time for those effects to be applied. Not generating a second histogram also reduces the latency by one frame.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIG. 2A shows a block diagram illustrating a first sequence of operations performed on raw image data of a digital image;

FIG. 2B shows a block diagram illustrating a second sequence of operations performed on raw image data of a digital image;

FIG. 6A shows three example input distributions of pixel intensity values of a digital image;

FIG. 6B shows an example standard histogram generated for the three example input distributions of FIG. 6A;

FIG. 6C shows an example bin weight function applied to the standard histogram of FIG. 6B;

FIG. 6D shows an example fuzzy bin histogram generated for the three example input distributions of FIG. 6A;

FIG. 6E shows an example bin weight function applied to the example fuzzy bin histogram of FIG. 6D;

DETAILED DESCRIPTION

Figure 1:
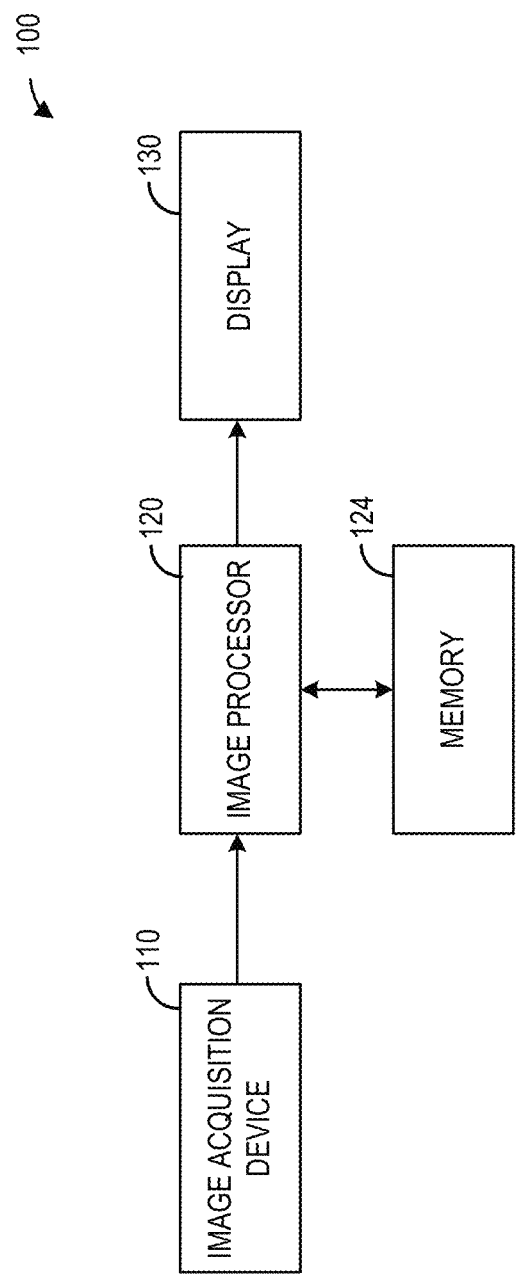
FIG. 1 shows a high-level block diagram illustrating an example image processing system for processing digital images according to an embodiment.

The following description relates to various embodiments of image processing for improving a subjective quality of digital images when displayed on a display device. In particular, systems and methods are provided for increasing a quality of a digital image by applying one or more picture quality improvement processes to the digital image.

Processing a digital image for display may include various picture quality improvement processes, such as tone mapping and contrast enhancement. Tone mapping may increase a contrast between elements in low-contrast areas (e.g., darker areas or lighter areas) of the digital image, and make color adjustments to improve a subjective quality of the digital image. Contrast enhancement may be applied after tone mapping, to increase a contrast between tone-mapped elements of the digital image. Tone mapping and contrast enhancement are often used when converting images with a standard dynamic range (SDR) of pixel intensity values to a high dynamic range (HDR) of pixel intensity values, or converting HDR images to SDR images.

Tone mapping and contrast enhancement may be adapted to a distribution of pixel intensity values of the digital image. The distribution of pixel intensity values may be represented by bars of an image histogram (also referred to herein as a histogram), where a range of the pixel intensity values of the digital image is divided into a plurality of bins, each bin representing a portion of the range of pixel intensity values. Each pixel of the digital image is then assigned to a corresponding bin based on an intensity value of the pixel, and a bar of the histogram is generated for each bin, where a height of the bar represents a number of pixels included in the bin. The histogram may be used as an input into a tone mapping algorithm, which may output an adjustment to be made to the pixel intensity values of the digital image. The adjustment may be subsequently applied to raw data of the digital image to produce an improved image.

However, a result of tone mapping may depend on how histogram data is collected. If too many bins are used (e.g., generating a histogram with a greater number of bars), the tone mapping algorithm may be overly sensitive, for example, to large areas of the same color. If too few bins are used (e.g., generating a histogram with a lesser number of bars), the tone mapping algorithm may be overly sensitive to boundaries between the large areas of the same color and areas of higher contrast, which may generate visual artifacts such as flashing.

For example, a sequence of digital image frames may be processed. A large portion of a first digital image frame may include a blue sky, where pixels in the blue sky may share very similar color values. As a result of sharing very similar color values, a large percentage of the pixels may be assigned to a first bin of a histogram of the first digital image frame. A tone mapping algorithm may then use the histogram to generate an improved first image frame. In a second, subsequent digital image frame, the color values may change slightly. In a new histogram generated for the second digital image frame, the large percentage of the pixels may not be assigned to the first bin, and may instead be assigned to a second bin of the new histogram. The tone mapping algorithm may use the new histogram to generate an improved second image frame. However, as a result of the large percentage of pixels of the second image frame being assigned to the second bin rather than the first bin, the improved second image frame may not have an appearance that is consistent with the improved first image frame, and a visual artifact may be generated on a display screen (e.g., a flash, etc.).

One approach to resolving this issue is to treat assignment of a pixel to a bin of a histogram as a fuzzy set. If the pixel is in a center of a range covered by the bin, the pixel is fully assigned to the bin. If the pixel is close to an edge of the range, the pixel may be assigned half to the bin and half to an adjacent bin. In this way, a distribution of image data in the histogram may be smoothed or flattened to provide a more stable histogram. However, while this may resolve some of the visual artifact issues such as flashing, the distribution may now look different depending on where in a given bin pixels of a low-contrast area fall, and different picture quality improvement algorithms based on different histogram data may still produce different or inconsistent results.

An additional problem is that histogram creation may delay the application of the image processing when displaying a sequence of digital images. A first histogram may be generated for a tone mapping algorithm based on a first image in the sequence, which may output a first adjustment to be applied to second image data (e.g., a second image) of the digital image sequence. A second histogram may then be generated from the tone-mapped image data (second image data), and a local contrast enhancement algorithm may use the second histogram to generate a second adjustment to be applied to the next image of tone-mapped image data (third image data). Because two histograms may be generated from raw image data for each frame of the sequence of digital images, a larger latency may be introduced when the sequence of images is displayed on a screen.

As described herein, these issues may be advantageously addressed by a method for generating a stable histogram of a digital image, where a sensitivity of the stable histogram to minor changes in pixel intensity values over time is reduced. The stable histogram may then be used by various picture quality improvement algorithms, including tone mapping algorithms and local contrast enhancement algorithms, to generate different adjustments to apply to the pixel intensity values of the digital image, which may be combined and applied together after processing is completed, rather than having to collect image data to generate a new histogram after each consecutive picture quality adjustment is performed.

The stable histogram may be generated using a lower resolution, bin-averaged histogram, where a first, smaller number of bins are generated and, for each bin of the lower resolution histogram, a representative value of the pixel values that fall within a that bin is identified (e.g., an average value, a median value). Then, the lower resolution histogram may be upsampled to form a higher resolution histogram, such that bins of the lower resolution histogram are selectively split into two new bins and the pixel values in each lower resolution bin are distributed to the two nearest higher resolution histogram bins such that the average of the two higher resolution histogram bins is the same as the average value of the lower resolution histogram bin. The higher resolution histogram may then be filtered to further reallocate pixels among the bins to produce a stable histogram. In doing so, artifacts may be reduced while also reducing latency, power, and cost.

The quality adjustments using the stable histogram approach described herein may be applied on a series of digital images, such as digital images processed by an image processing system, such as the image processing system 100 of FIG. 1. Two standard methods of applying quality adjustments (e.g., based on a tone-mapping algorithm and/or a local contrast enhancement algorithm) to a digital image are shown in FIGS. 2A and 2B. The standard methods may be inefficient, resulting in latency issues. For a given distribution of image data, such as one of the exemplary image distributions of FIG. 6A, applying the quality adjustments previously included generating a standard histogram, such as the standard histogram shown in FIG. 6B, using a bin weight function such as the bin weight function shown in FIG. 6C, or generating a fuzzy bin histogram, such as the fuzzy bin histogram shown in FIG. 6D, using a bin weight function such as the bin weight function shown in FIG. 6E.

Figure 3A:
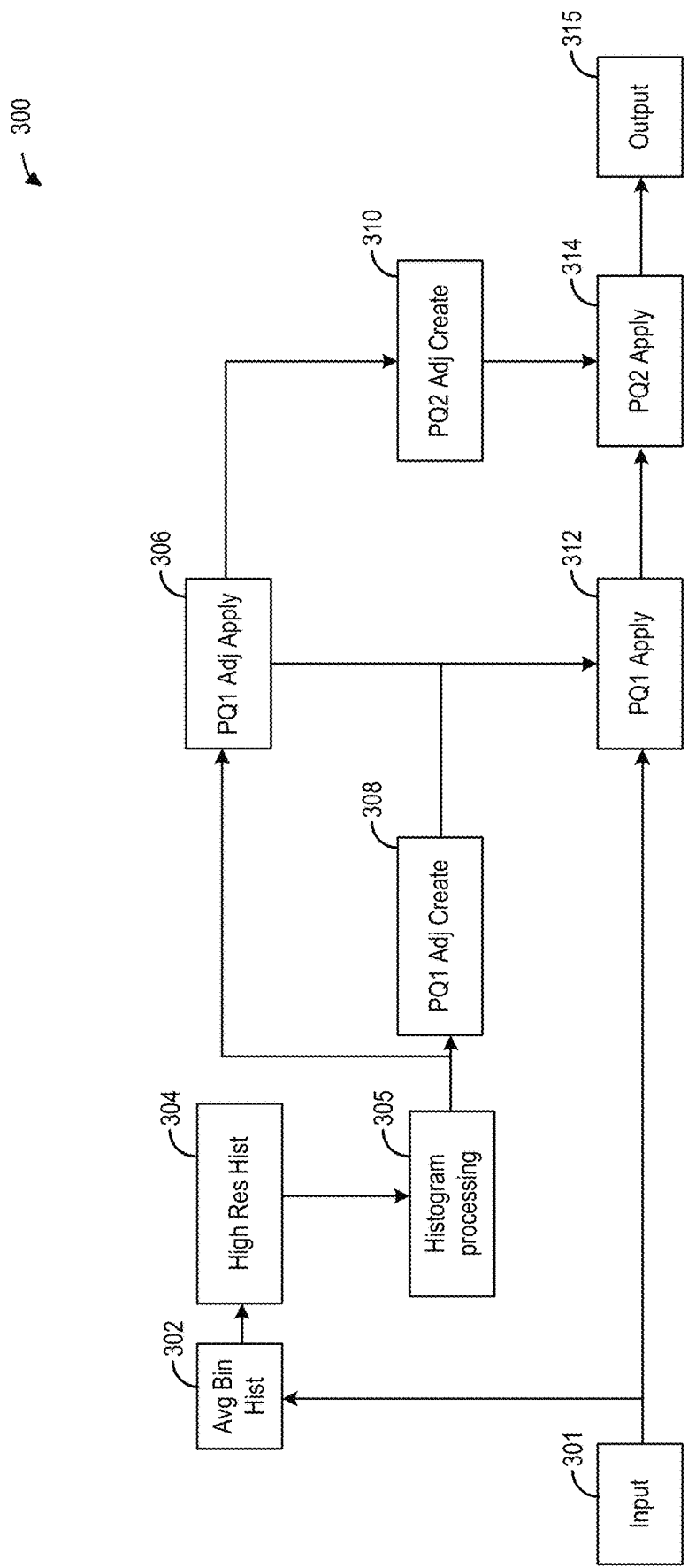
FIG. 3A shows a block diagram illustrating a third sequence of operations performed on raw image data of a digital image according to an embodiment of the disclosure.
Figure 3B:
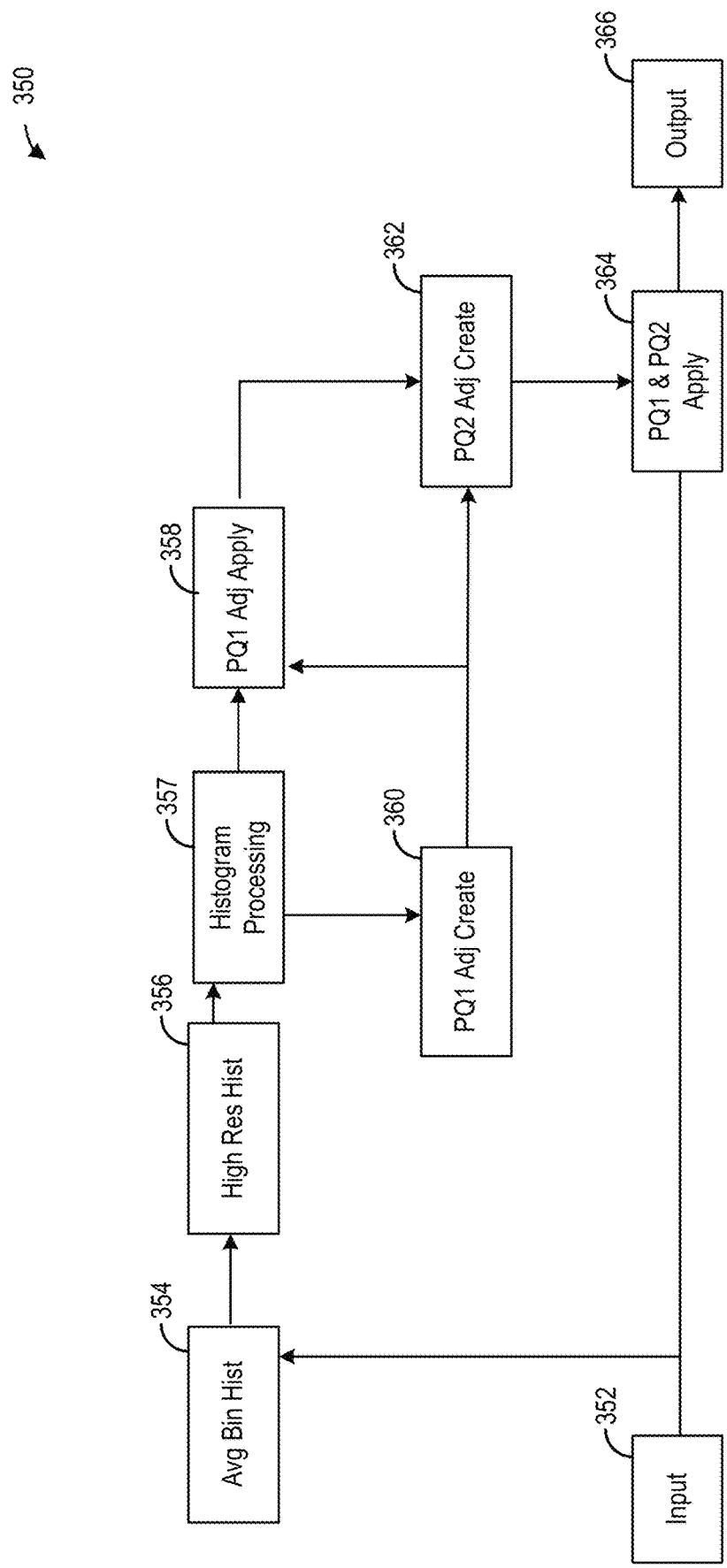
FIG. 3B shows a block diagram illustrating a fourth sequence of operations performed on raw image data of a digital image according to an embodiment of the disclosure.
Figure 4:
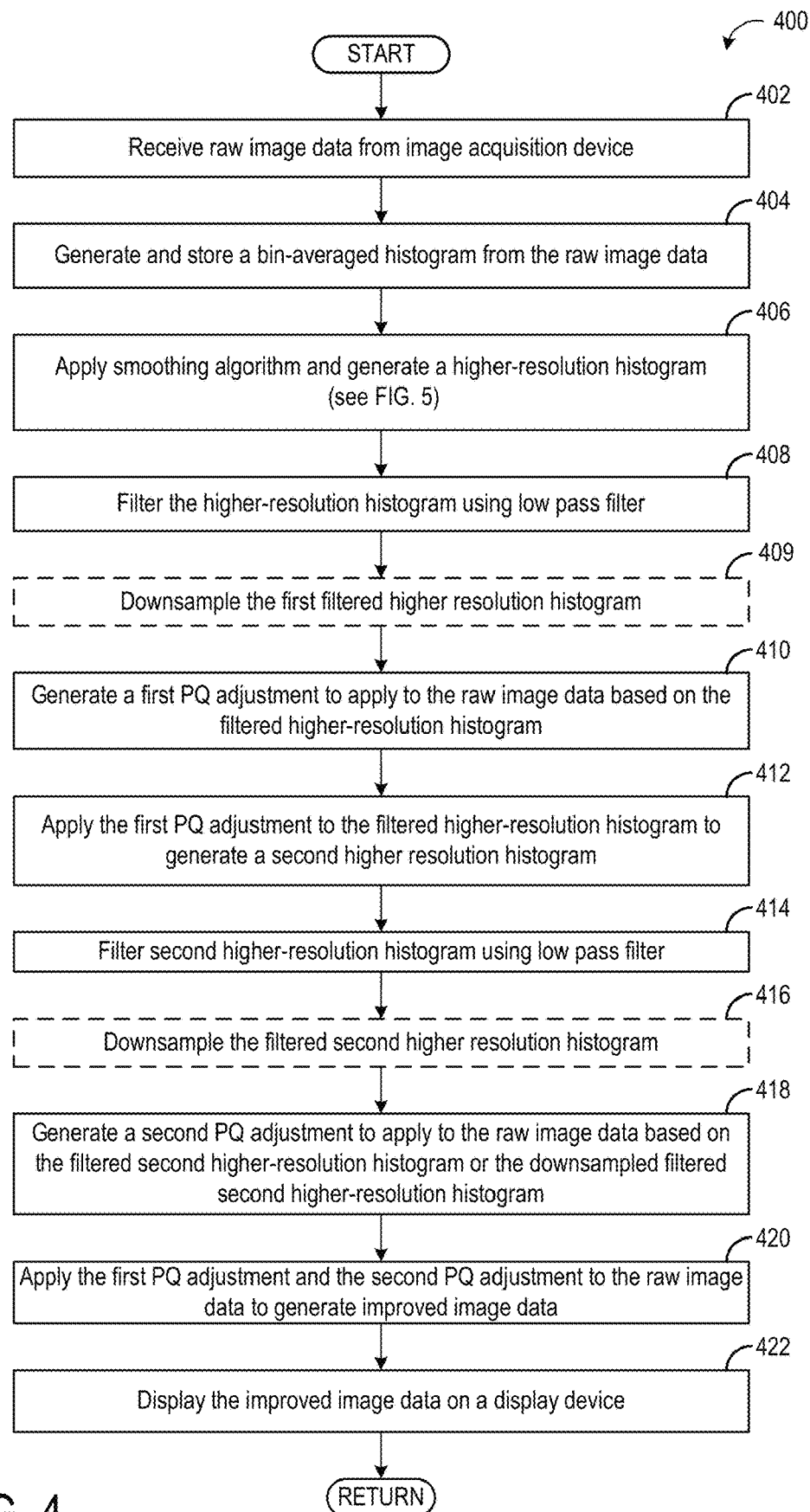
FIG. 4 shows a high-level flow chart illustrating an example method for improving a quality of a digital image according to an embodiment of the disclosure.
Figure 7A:
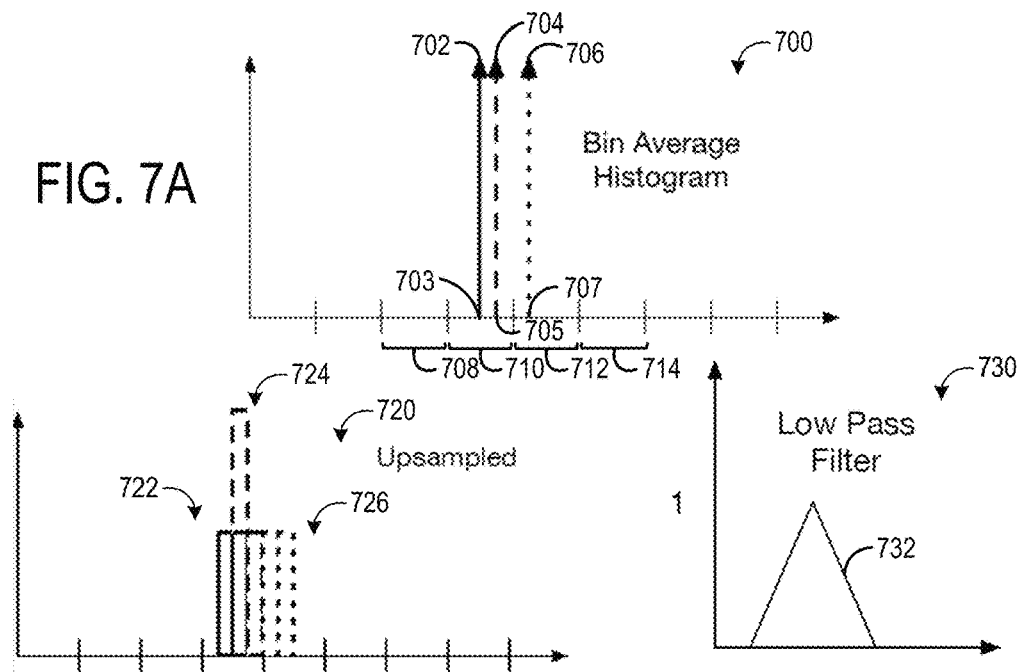
FIG. 7A shows example bin-averaged histograms generated for the three example input distributions of FIG. 6A, according to an embodiment of the disclosure.

Thus, according to embodiments disclosed herein, a first quality adjustment (e.g., based on a tone-mapping algorithm) and a second quality adjustment (e.g., based on a local contrast enhancement algorithm) may be generated and applied in a first, more efficient manner, as illustrated in FIG. 3A, or in a second, more efficient manner, as illustrated in FIG. 3B. An example method for applying the first quality adjustment and the second quality adjustment in the first and/or second more efficient manners of FIGS. 3A and 3B is shown in FIG. 4. The example method includes applying an algorithm such as a bin averaging algorithm to a first lower resolution histogram of the digital image and upsampling histogram data of the first histogram to a second, higher resolution histogram, as shown in FIG. 8 and described in an example method of FIG. 5. An example bin-averaged histogram for the input distributions of FIG. 6A is shown in FIG. 7A. Here, all pixels within each bin are treated as having a common value: their average. The bin-averaged histogram may be upsampled to produce the higher resolution histogram shown in FIG. 7B. A filtered version of the high resolution histogram for the thee input distributions of FIG. 6A shown in FIGS. 7D, 7F and 7H may be created by applying a low pass filter shown in FIG. 7C. Finally, histograms of the desired resolution can be generated by downsampling the high resolution histogram. The result for the three different input distributions of FIG. 7A after bin averaging, upsampling, filtering, and downsampling are shown in FIGS. 7E, 7G, and 7I.

FIG. 1 shows a high-level block diagram illustrating an example image processing system 100 for processing one or more digital images for display. The components of the image processing system 100 may be combined in a shared enclosure (not shown), in some examples, such as within a single camera apparatus or a mobile phone. Alternatively, one or more components of the image processing system 100 may be configured as peripheral devices that may be communicatively coupled to form the image processing system 100.

The image processing system 100 may include an image acquisition device 110. The image acquisition device 110 may comprise an image sensor or camera, for example, configured to acquire one or more digital images. In some embodiments, the one or more digital images may be image frames of a sequence of video images.

The image processing system 100 may comprise an image processor 120 communicatively coupled to the image acquisition device 110 and configured to receive the one or more digital images from the image acquisition device 110. In some embodiments, the image processor 120 may be configured to control the image acquisition device 110 to adjust one or more acquisition parameters of image acquisition device 110. The image processor 120 may be configured to process the one or more digital images received from the image acquisition device 110, as described further herein with regard to FIGS. 2-8. For example, the image processor 120 may leverage the information from the one or more digital images to improve a quality of the one or more digital images by applying one or more picture quality improvement algorithms, such as a tone mapping algorithm.

The image processor 120 may comprise one or more physical devices configured to execute one or more instructions. For example, the image processor 120 may comprise one or more processors that are configured to execute software instructions. Additionally, or alternatively, the image processor 120 may comprise one or more hardware or firmware logic machines configured to execute hardware or firmware instructions. The image processor 120 may be single or multi-core, and the programs executed thereon may be configured for parallel or distributed processing.

The image processing system 100 may include a memory 124 comprising non-transitory and transitory memory for storing instructions to be executed by the image processor 120 to perform the methods described further herein. The memory 124 may further provide a buffer and/or cache for storing data relating to the processing of image frames from the image acquisition device 110, in order to support the functions of the image processor 120.

The image processing system 100 further comprises a display 130 communicatively coupled to the image processor 120 and configured to display the one or more digital images output by the image processor 120 to the display 130. That is, the image processor 120 may present a visual representation of data held or output by the image processor 120 and/or the memory 124. The display 130 may comprise a display device utilizing virtually any type of technology.

The display 130, or in some examples, more than one display device, may include a processor, additional memory, communication module, user input device, screen or monitor, and/or other subsystems, and may be in the form of a desktop computing device, a laptop computing device, a tablet, a smart phone, or other device. When viewing images via the display 130, a user of the image processing system 100 may enter input via a user input device, which may include a keyboard, mouse, microphone, touch screen, stylus, or other device, that may be processed by the image processor 120.

FIG. 2A shows a block diagram illustrating a first sequence 200 of operations performed on raw image data of a digital image according to prior art. The operations may be part of a tone mapping algorithm applied by an image processing system to improve an image quality of the raw image data. The raw image data may comprise a sequence of image frames acquired by an image acquisition device such as a camera.

In the first sequence 200, a picture quality (PQ) adjustment may be applied to input image data 201 to generate output image data 215, where the output image data 215 has a quality that is improved over the input image data 201. For example, the PQ adjustment may alter color tones of the input image data 201, in accordance with a first tone mapping algorithm, to accentuate differences in pixel intensity values within dark or light regions of an image. To generate the PQ adjustment, the input image data 201 may be inputted into a histogram create block 202, which may generate a histogram from the input image data 201. In some embodiments, the histogram may be a standard histogram generated in accordance with a standard algorithm for generating histograms. In other embodiments, the histogram may be a fuzzy bin histogram generated in accordance with a fuzzy bin algorithm for generating histograms.

As an example, FIG. 6A shows an example input distribution graph 600 of image data for three image frames, where the input comprises pixel intensity values from a large area of pixels that are almost the same value (e.g., a blue sky with minor variations in color). Three input distributions are shown aligned along an X axis: a first input image distribution 602 for a first image, a second input image distribution 604 for a second image, and a third input image distribution 606 for a third image. The X axis represents a range of pixel intensity values and is divided into a plurality of bins, where a left-most bin represents a lowest range of pixel intensity values (e.g., the darkest areas of the image) and a right-most bin represents a highest range of pixel intensity values (e.g., the brightest areas of the image). Pixels of first input distribution 602 fall within a first bin 608, centered on a midpoint of first bin 608. Pixels of second input distribution 604 also fall within first bin 608, close to a border between first bin 608 and a second bin 610. Pixels of third input distribution 606 fall within second bin 610, just over the border between first bin 608 and second bin 610. In the example of the blue sky, first input image distribution 602 may include pixels of a first blue color; second input image distribution 604 may include pixels of a second, lighter blue color; and third input image distribution 606 may include pixels of a third blue color lighter than the first blue color and the second blue color.

FIG. 6B shows an example standard histogram 620 generated from the image data of input distribution graph 600. A first bar 622 of standard histogram 620 represents the pixel intensity values of first input image distribution 602 and second input image distribution 604, which fall within first bin 608, and a second bar 624 represents the pixel intensity values of third input image distribution 606, which fall within second bin 610. Since the pixels of the second input image distribution 604 are close to the border between the first bin 608 and the second bin 610, a slight shift in color on the next frame (e.g. if the next frame has a distribution similar to the third input image distribution 606) may result in in a rapid shift of the histogram's contents. Since PQ adjustments may depend on the content of the histogram, rapid changes in the histogram may cause rapid changes in the PQ adjustment, ultimately resulting in possible visual artifacts, such as flashing. Therefore, a more stable histogram may be desired.

The height of bars of a histogram may depend on a weight function. Standard histogram processing applies the same weight to each pixel whose value falls within the borders of a bin, as shown in FIG. 6C. In FIG. 6C, a bin weight function graph 630 indicates that a first bin weight function 632 (e.g., a step function) may be applied to pixel intensity values of first bin 608, and a second bin weight function 634 may be applied to pixel intensity values of second bin 610, where first bin weight function 632 and second bin weight function 634 both assign weights of 1 to the pixel intensity values.

Because second input image distribution 604 lies close to the border between first bin 608 and second bin 610, standard histogram 620 may be unstable. For example, after the first image frame of the image data, second input image distribution 604 shifts to the right in the third image frame by a value equal to half the width of a bin or less, and thus standard histogram 620 may shift suddenly one full bin. After applying a tone mapping algorithm using the shifted standard histogram 620, the shift may cause a discontinuity between the first image frame and the second image frame, which may be visibly detected as a flash, flicker, or similar visual distortion.

To fix the instability when large areas of the same color are close to the edge of a histogram bin, a fuzzy set approach may be taken by adjusting the weight function. FIG. 6E shows an alternative fuzzy bin weight function graph 650 that may be applied to the image data of input distribution graph 600, indicating that a first fuzzy bin weight function 652 may be applied to pixel intensity values of first bin 608, and a second fuzzy bin weight function 654 may be applied to pixel intensity values of second bin 610. Fuzzy bin weight function graph 650 may indicate, for example, that a weight of 1 is assigned when a value is at the center of a bin, a weight of 0.5 is assigned when a value is close to a border of a bin, and 0 is assigned when a value is at a center of a neighboring bin.

FIG. 6D shows an example fuzzy bin histogram 640 generated by applying fuzzy bin weight function graph 650 to the image data of input distribution graph 600. First fuzzy bin weight function 652 may be applied to first input image distribution 602 which is in the middle of the bin, therefore the weights are all close to one, resulting in a first bar 642. First bar 642 is shown as entirely within first bin 608, as no pixel intensity values of first input distribution 602 are close to the borders of first bin 608 or second bin 610. Both first fuzzy bin weight function 652 and second fuzzy bin weight function 654 may be applied to second input image distribution 604, resulting in a second bar 644. Second bar 644 spans first bin 608 and second bin 610, since a first portion of the pixel intensity values of second input distribution 604 is assigned a weight of just over 0.5 by first fuzzy bin weight function 652 (values close to the center of first bin 608); a second portion of the pixel intensity values of second input distribution 604 is assigned a weight of just less than 0.5 by second fuzzy bin weight function 654 (weights for bin 610). Similarly, both first fuzzy bin weight function 652 and second fuzzy bin weight function 654 may be applied to third input image distribution 606, resulting in a third bar 646. Third bar 646 spans first bin 608 and second bin 610, since a first portion of the pixel intensity values of third input distribution 606 is assigned a weight of just less than 0.5 by first fuzzy bin weight function 652 (values close to center of bin 608); the first portion of the pixel intensity values of third input distribution 606 is assigned a weight of just over 0.5 by second fuzzy bin weight function 654 (values close to the center of bin 610).

While this resolves the instability, it may cause issues for histogram-based algorithms that limit how much a single bin can contribute to the results. A change in brightness of image data that exceeds a threshold in some cases and not in others can make picture quality tuning more difficult. For example, undesirable changes may result during a fade in/out of a scene.

Returning to FIG. 2A, the histogram created at histogram create block 202 may be an input into a PQ adjustment creation block 204, where the PQ adjustment may be created from the histogram. The PQ adjustment outputted by PQ adjustment creation block 204 may be an input into a PQ adjustment application block 206. At PQ adjustment application block 206, the PQ adjustment may be applied to the input image data 201 to generate the output image data 215. The output image data 215 may be displayed on a display device or additional processing may be performed on the output image data 215 before displaying the output image data 215 on the display device. For example, as described below, a second PQ adjustment may be applied to the output image data 215 in accordance with a second tone mapping algorithm.

FIG. 2B shows a block diagram illustrating a second sequence 250 of operations performed on raw image data of a digital image according to prior art, where a first PQ adjustment (as described above in reference to FIG. 2A) to the input image data 201 is followed by a second PQ adjustment to generate the output image data 215. Thus, second sequence 250 includes histogram create block 202, PQ adjustment creation block 204, and PQ adjustment application block 206 from the first sequence 200 described above.

In the second sequence 250, the output of the PQ adjustment application block 206 is inputted into a second histogram create block 208, which may generate a second histogram. The second histogram may be a standard histogram, or the second histogram may be a fuzzy bin histogram. The second histogram outputted by second histogram create block 208 may be an input into a second PQ adjustment creation block 210, which may generate the second PQ adjustment.

For example, the second PQ adjustment may be generated by a contrast enhancement algorithm applied after a first, tone-mapping algorithm. The second PQ adjustment outputted by the second PQ adjustment creation block 210 may be inputted into a second PQ adjustment application block, which may apply the second PQ adjustment to the image data outputted by the PQ adjustment application block 206 to generate the output image data 215. In other words, the second PQ adjustment may be applied to a result of applying first PQ adjustment to the input image data 201.

Note that the second PQ adjustment creation block 210 depends on the second histogram create block 208, which in turn depends on results from the PQ1 adjustment application block 206. The PQ adjustment application block 206 will generate a full frame with PQ1 applied to the pixels. The second histogram creation depends on the full frame, which is an intermediate step not shown on the display. Therefore, the second sequence 250 requires two frames to generate each single image (one to render the intermediate step of PQ adjustment application block 206 and the other to render the output image data 215).

FIG. 3A shows a block diagram illustrating a third sequence 300 of operations performed on raw image data of a digital image according to an embodiment of the disclosure, where the third sequence 300 may be a more efficient sequence of operations than second sequence 250 of FIG. 2B. The operations may be part of a tone mapping algorithm applied by an image processing system, such as image processing system 100, to improve an image quality of the raw image data. In various embodiments, the raw image data may comprise a sequence of image frames acquired by an image acquisition device (e.g., image acquisition device 110) such as a camera.

As described herein, third sequence 300 may reduce an overall amount of time consumed by the operations while also eliminating one frame of latency by skipping the calculation of a second histogram. Operations carried out in the various blocks of third sequence 300 that are different from the operations described above in reference to FIGS. 2A and 2B are described in more detail below in reference to FIGS. 4 and 5.

In the third sequence 300, a bin-averaged histogram 302 may be generated from input image data 301. Using the bin-averaged histogram 302, a higher resolution histogram 304 is created, such as via method 500 explained in more detail below with respect to FIG. 5. To generate the higher resolution histogram 304, histogram processing may be performed at histogram processing block 305, such as low-pass filtering the higher resolution histogram 304 and down-sampling the filtered histogram. The processed histogram may then be used to create a first PQ adjustment (PQ1) 308 and a second PQ adjustment (PQ2) 310.

For example, FIGS. 7A-7I show an example of applying a statistical/smoothing method to bin-averaged histograms, such as according to method 400 (see FIG. 4) disclosed herein, to the three example distributions given in FIG. 6A.

In FIG. 7A, example a bin-averaged histogram 700 shows example histogram impulses for the three example input image distributions of graph 600 of FIG. 6A, described above. As in FIG. 6A, pixel intensity values are assigned to bins plotted on a horizontal axis of bin-averaged histogram 700. Four bins are shown in FIG. 7A, including first bin 708, second bin 710, third bin 712, and fourth bin 714. However, more or fewer bins are possible without departing from the scope of this disclosure. A first bin-averaged histogram impulse 702 (depicted as a solid arrow in FIG. 7A) indicates an average pixel intensity value for first input image distribution 602. First bin-averaged histogram impulse 702 is based at a center point 703 of second bin 710 of the bin-averaged histogram 700, corresponding to a center point of first input image distribution 602. Similarly, a second bin-averaged histogram impulse 704 (shown as a dashed arrow in FIG. 7A) indicates an average pixel intensity value for second input image distribution 604. Second bin-averaged histogram impulse 704 is based at a point 705 in second bin 710 of the bin-averaged histogram 700, near the border between second bin 710 and third bin 712 of the bin-averaged histogram 700, corresponding to a center point of second input image distribution 604. A third bin-averaged histogram impulse 706 (shown as the dotted arrow in FIG. 7A) indicates an average pixel intensity value for third input image distribution 606. Third bin-averaged histogram impulse 706 is based at a point 707 in third bin 712, near the border between second bin 710 and third bin 712, corresponding to a center point of third input image distribution 606.

Figure 7B:
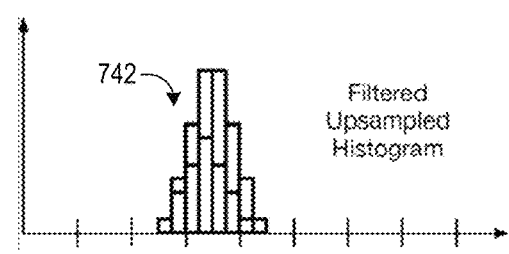
FIG. 7B shows example upsampled histograms generated from example bin-averaged histogram of FIG. 7A, according to an embodiment of the disclosure.
Figure 8:
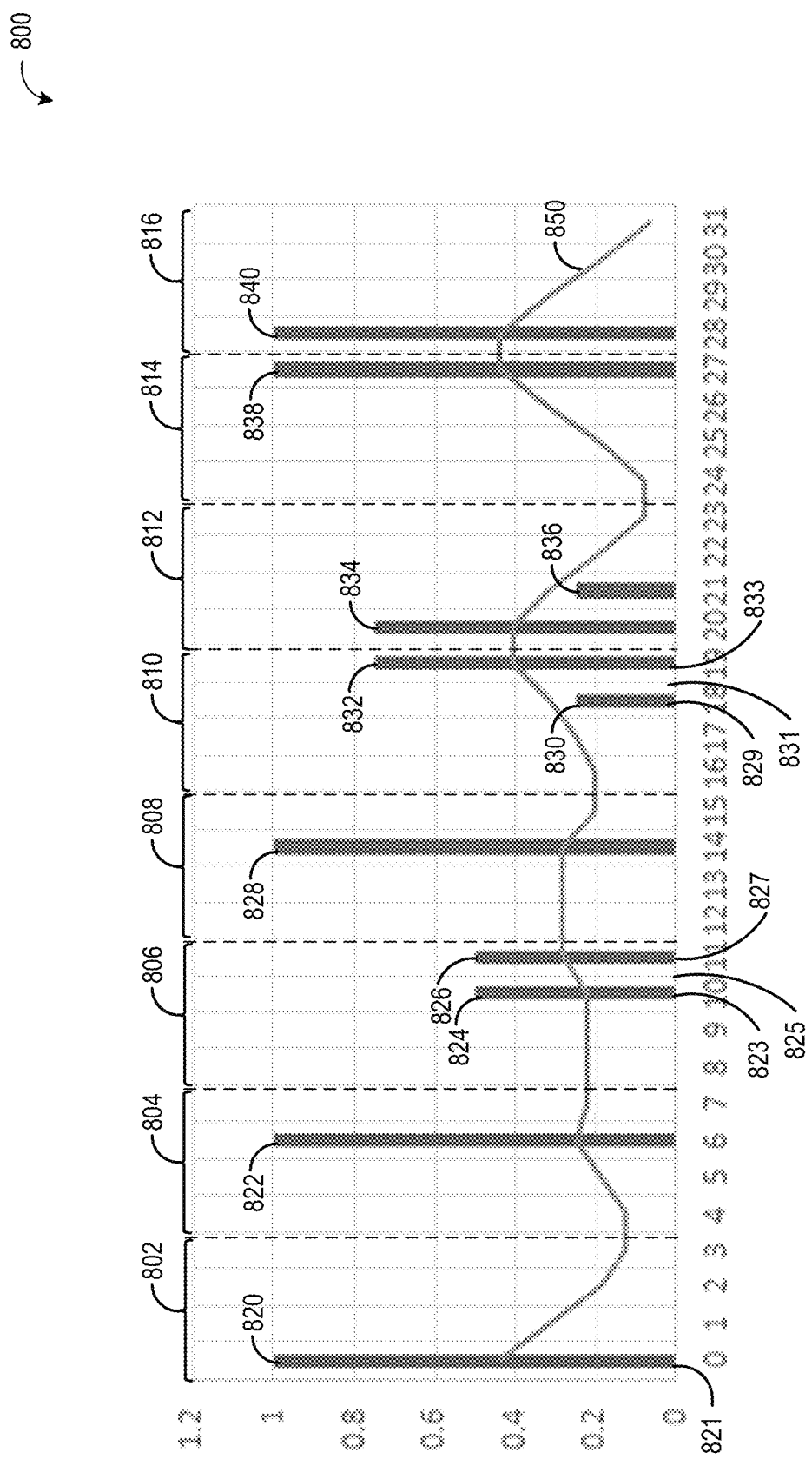
FIG. 8 shows an example upsampled higher resolution histogram generated from average pixel intensity values of a lower resolution histogram according to an embodiment of the disclosure.

In FIG. 7B, the bin-averaged histograms are upsampled to form a plurality of higher resolution histograms 720. The upsampling may be performed according to method 500 explained in more detail below. A first upsampled histogram 722 (shown in solid lines) corresponds to the upsampling of the bin-averaged histogram of the first impulse 702. The first upsampled histogram 722 has more bins, and therefore a higher resolution, than the original bin-averaged first impulse 702. Note that the pixels of first upsampled histogram 722 have been split into two equally-sized bins. Using the same process for generating the other histograms gives a second upsampled histogram 724 (shown in dashed lines) of the second bin-averaged impulse 704 and a third upsampled histogram 726 (shown in dotted lines) of the third bin-averaged histogram impulse 706. Although the resolution is higher, the higher resolution histograms 720 may likely have bins with zero pixels counted. For greater statistical stability, a low-pass filter 730 is often applied to smooth out the distribution by filling in the bins with zero pixels.

Figure 7C:
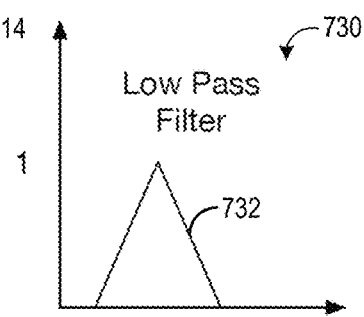
FIG. 7C shows an example low pass filter used to generate the example filtered histogram of FIG. 7B, according to an embodiment of the disclosure.

FIG. 7C shows an example of a low-pass filter 732 to be applied to the higher resolution histograms 720. The low-pass filter 732 may have a triangular shape, similar to the bin-weighting function of FIG. 6E in order to approximate the fuzzy bin approach, though other filtering shapes are possible.

Figure 7D:
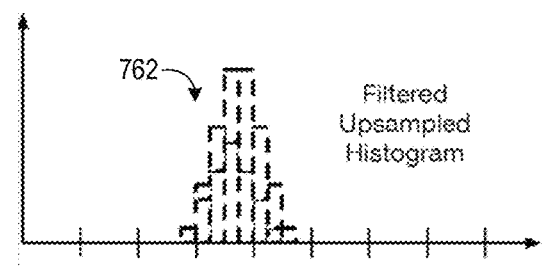
FIG. 7D shows a filtered upsampled histogram for a first input distribution of FIG. 6A, according to an embodiment of the disclosure.
Figure 7E:
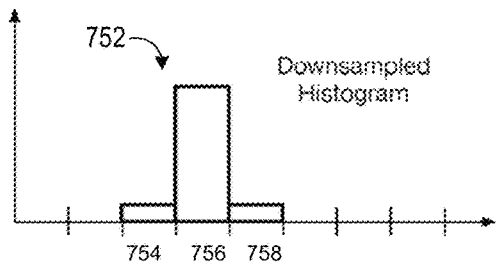
FIG. 7E shows a downsampled histogram of the filtered upsampled histogram of FIG. 7D.
Figure 7F:
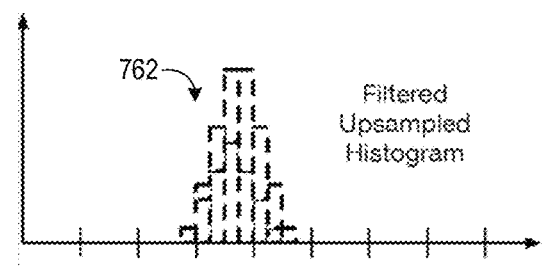
FIG. 7F shows a filtered upsampled histogram for a second input distribution of FIG. 6A, according to an embodiment of the disclosure.
Figure 7G:
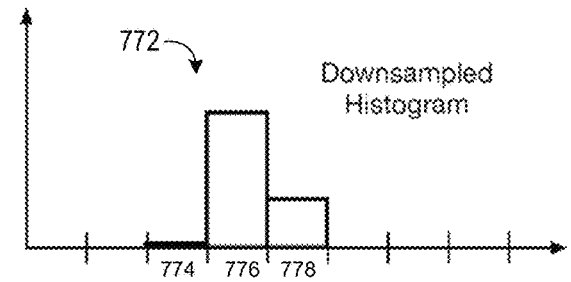
FIG. 7G shows a downsampled histogram of the filtered upsampled histogram of FIG. 7F.
Figure 7H:
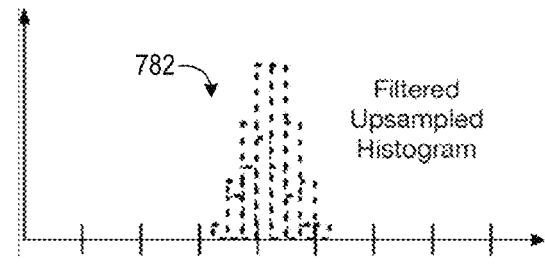
FIG. 7H shows a filtered upsampled histogram for a third input distribution of FIG. 6A, according to an embodiment of the disclosure.
Figure 7I:
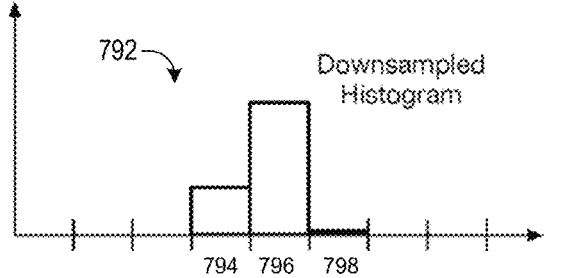
FIG. 7I shows a downsampled histogram of the filtered upsampled histogram of FIG. 7H.

FIG. 7D shows a first filtered upsampled histogram 742, which is the result of applying the low-pass filter 732 to the first upsampled histogram 722. Compared to first upsampled histogram 722, the first filtered upsampled histogram 742 appears to more closely match a Gaussian distribution, with more of the empty bins populated. Similarly, FIG. 7F shows a second filtered upsampled histogram 762 resulting from the application of the low pass filter 732 to the second upsampled histogram 724. FIG. 7H shows the same process, applied to the third upsampled histogram 726 to generate a third filtered upsampled histogram 782.

In FIG. 7E, the first filtered upsampled histogram 742 is downsampled to form a first downsampled histogram 752. Downsampling is accomplished by adding the pixel intensity values of neighboring bins together. For example, if the downsampling is done at a ratio of 2:1, the contents of each two neighboring bins are added to form one new bin. Similarly, in FIG. 7G, a second downsampled histogram 772 is the result of downsampling the second filtered upsampled histogram 762 and FIG. 7I a third downsampled histogram 792 represents a downsampling of the third filtered upsampled histogram 782.

An advantage of the stable histogram approach disclosed herein may be seen in the downsampled histograms 752, 772, and 792, which represent the input image distributions 602, 604, and 606, respectively. The downsampled histograms 752, 772, and 792 are relatively insensitive with respect to small changes in the center of the input distributions. For example, the peaks of the downsampled histograms (including first peak 756, second peak 776, and third peak 796) maintain a relatively stable height across the three image frames/input image distributions, while the bins to either side of the peaks (including first 754 and second 758 of first downsampled histogram 752, third bin 774 and fourth bin 778 of second downsampled histogram 772, and fifth bin 794 and sixth bin 798 of third downsampled histogram 792) change relatively across the three image frames. Compared to the standard histogram 620 and the fuzzy bin histogram 640, the downsampled histograms may have a relatively stable statistical profile. A more stable profile may provide more stable data to generate histogram-dependent PQ adjustments, resulting in more stable adjustments, which may in turn reduce visual artifacts, such as flashing.

Referring back to FIG. 3A, to generate first PQ adjustment and second PQ adjustment, the input image data 301 may be inputted into an image statistic block such as a bin-averaged histogram block 302, where a bin-averaged histogram of the input image data 301 may be created. As described in further detail herein, a stability of the bin-averaged histogram may be increased over a standard histogram and/or a fuzzy bin histogram. As a result of the increased stability, the bin-averaged histogram may be used to generate a plurality of PQ adjustments. The bin-averaged histogram outputted by the bin-averaged histogram block 302 can be used to generate a higher resolution histogram block 304. Alternatively, the higher resolution histogram 304 may be generated directly from the input image data 301. At the higher resolution histogram block 304, the bin-averaged histogram may be upsampled to a higher resolution histogram. For example, if the bin-averaged histogram includes 8 bins/bars, the higher resolution histogram may include 32 bars. As described in greater detail below in reference to FIGS. 5 and 8, upsampling to a higher resolution histogram results in increased histogram stability.

The higher resolution histogram outputted by the higher resolution histogram block 304 may be an input into a histogram processing block 305, which may apply a low-pass filter and/or downsample the high-resolution histogram, as explained above with respect to FIGS. 7A-7I. The processed histogram is then output to the first PQ adjustment creation block 308, which outputs the first PQ adjustment. The first PQ adjustment 308 may subsequently be applied both to the higher resolution histogram (e.g., from which the first PQ adjustment was created) at a first PQ adjustment application block 306, and to the input image data 301 at first PQ adjustment application block 312 as described above. When the first PQ adjustment is applied to the higher resolution histogram at first PQ adjustment application block 306, an adjusted higher resolution histogram outputted by first PQ adjustment application block 306 may be an input into a second PQ adjustment creation block 310. Again, the higher resolution histogram data may be low pass filtered and downsampled. Second PQ adjustment creation block 310 may output a second PQ adjustment based on the adjusted higher resolution histogram, which may be applied to the result of applying the first PQ adjustment to the input image data 301 at the first PQ adjustment application block 312. The output image data 315 may be an output of second PQ adjustment application block 314.

An alternative to the above would be to apply the PQ1 adjustment of the first PQ adjustment application block 306 to the bin-averaged histogram block 302 and then duplicate the higher resolution histogram creation and histogram processing before creating the PQ2 adjustment at the second PQ creation block 310. While such an approach may improve image quality similar to the approach shown in FIG. 3A, additional low-pass filtering may be required, and thus the process may not be as efficient as the approach of FIG. 3A.

FIG. 3B shows a block diagram illustrating a fourth sequence 350 of operations performed on raw image data of a digital image according to an embodiment, where the fourth sequence 350 may be an alternative sequence to third sequence 300 of FIG. 3A, and a more efficient sequence of operations than the sequences described in relation to FIGS. 2A and 2B. The operations performed in fourth sequence 350 may be the same as or substantially similar to the similarly named operations of third sequence 300. In particular, a first PQ adjustment and a second PQ adjustment may be performed on input image data 352 to generate output image data 366. However, in contrast to third sequence 300, the second PQ adjustment may not be applied to a result of applying the first PQ adjustment to the input image data 352, rather, the first PQ adjustment and the second PQ adjustment may be applied together.

As with third sequence 300, in fourth sequence 350, the input image data 352 may be inputted into a bin-averaged histogram block 354, where a bin-averaged histogram of the input image data 352 may be created. The bin-averaged histogram outputted by the bin-averaged histogram block 354 may be an input into a higher resolution histogram block 356. At the higher resolution histogram block 356, the bin-averaged histogram may be upsampled to a higher resolution histogram. The higher resolution histogram outputted by the higher resolution histogram block 356 may be an input into a histogram processing block 357 which may include low-pass filtering and downsampling. The result of histogram processing block 357 is then output into a first PQ adjustment creation block 360, which outputs the first PQ adjustment.

However, in contrast to third sequence 300, in fourth sequence 350, the first PQ adjustment may be applied to the higher resolution histogram (e.g., from which the first PQ adjustment was created) at a first PQ adjustment application block 358, but not to the input image data 352 (e.g., as described above in reference to FIG. 3A). When the first PQ adjustment is applied to the higher resolution histogram at first PQ adjustment application block 358, an adjusted higher resolution histogram outputted by first PQ adjustment application block 358 may be an input into a second PQ adjustment creation block 362. Second PQ adjustment creation block 362 may output the second PQ adjustment. In fourth sequence 350, the first PQ adjustment 360 and the second PQ adjustment 362 may both be applied to the input image data 352 at a combined PQ1/PQ2 adjustment application block 364. The output image data 366 may be an output of combined PQ1/PQ2 adjustment application block 364. PQ adjustments are often applied to the data by generating a look up table (LUT) that maps an input pixel value to an output pixel value. One method of combining the two PQ adjustments is to generate the LUT by first applying the first PQ adjustment and then using the output of that adjustment as the input to the second PQ adjustment, the output of which is stored in the LUT. Those two LUT operations in the third sequence 300 are now combined to one LUT operation in the fourth sequence 350. To get similar results in the third sequence 300 would demand larger LUTs in the first PQ adjustment application block 312 and the second PQ adjustment application block 314 and more precision between them, both of which increase power and area of the implementation. For both of the approaches described herein (e.g., as described with respect to FIGS. 3A and 3B), a second histogram, such as the second histogram created at second histogram create block 208 of FIG. 2B, may not need to be created. This eliminates one frame of latency, as creating the histogram would require one frame of data. Combining the application of PQ1 and PQ2 may also increase the efficiency of these algorithms by reducing errors due to quantization.

Referring now to FIG. 4, a flowchart is shown illustrating an example method 400 for improving a quality of image data according to an embodiment. Method 400 is described with regard to the systems and components of FIG. 1, though it should be appreciated that the method 400 may be implemented with other systems and components without departing from the scope of the present disclosure. Method 400 may be implemented as instructions in memory 124, for example, executable by the image processor 120 to perform the actions described herein.

Method 400 begins at 402, where method 400 includes receiving raw image data from an image acquisition device, such as the image acquisition device 110 of FIG. 1. In various embodiments, the raw image data may be image frame data of a sequence of images (e.g., digital video). Specifically, the raw image data may comprise pixel intensity values of a plurality of pixels, where each pixel intensity value indicates a brightness or tonal value of a corresponding pixel of an acquired image or frame. For example, a group of pixels with higher pixel intensity values may indicate a brighter portion of an image, while a group of pixels with lower pixel intensity values may indicate a darker portion of an image.

At 404, method 400 includes generating and storing a bin-averaged histogram from the raw data. The bin-averaged histogram may be generated by plotting the pixel intensity values of the raw image data into a plurality of bins, where each bin counts the number of pixel intensity values that fall within the range of pixel values for that bin. The average pixel intensity within each bin is also stored by summing the pixel values for the bin and dividing by the number of pixels assigned to that bin.

For example, a bin-averaged histogram may cover a total range of tonal values of a series of images of the raw image data. The total range of tonal values may be plotted on a horizontal axis of the standard histogram and divided into 10 bins, each bin of the 10 bins representing a portion (e.g., one tenth) of the total range of tonal values. Each pixel intensity value of the series of images may then fall into one of the portions, where the pixel intensity value is between a lower bound of a range of the portion and an upper bound of the range. Depending on an input distribution of image data corresponding to a single image, the pixel intensity values may fall into a number of different bins. If a variance in the pixel intensity values is small, the pixel intensity values may fall into one or a small number of bins. If the variance is larger, the pixel intensity values may fall into a larger number of bins. Additionally, as image data of subsequent images is processed, the input distribution may change. For example, in a first frame of a video recording, a first input distribution may cause most of the pixel intensity values to fall into a first number of bins, and in a second frame of the video recording, a second input distribution may cause most of the pixel intensity values to fall into a second, different number of bins. This may occur, for example, when a dark image is followed by a subsequent bright image.

At 406, method 400 includes generating a standard higher resolution histogram. The generation of the higher resolution histogram splits the number of samples counted in each bin of the average bin histogram into two bins of the higher resolution histogram such that the average value of those two bins is the same as the average value of the bin in the bin-averaged histogram.

At 408, method 400 includes filtering the higher resolution histogram using a low pass filter. Applying a low pass filter to the higher resolution histogram may make the higher resolution histogram more stable, by flattening and distributing bars of the higher resolution histogram across a greater number of bins. Upsampling of the histogram often creates bins with zero pixels. Low-pass filtering smooths the distribution by filling in the bins with no pixels, creating a histogram which may be more insensitive with respect to small changes in the input distribution. An example of the effect of applying a low pass filter to an image histogram is shown in FIGS. 7B-7I.

At 409, method 400 includes downsampling the filtered histogram. Downsampling is performed because some tone-mapping algorithms may take a low-resolution histogram as an input and further because downsampling reduces the number of subsequent operations. Downsampling is the process of combining neighboring bins together into a single bin, adding the pixel intensity counts of neighboring bins together. Because the higher resolution histogram has been filtered, the lower resolution histogram is more stable.

At 410, method 400 includes generating a first picture quality adjustment PQ1 to apply to the raw image data based on the filtered higher resolution histogram or the downsampled version. At 412, method 400 includes applying the first picture quality adjustment to the filtered higher resolution histogram to generate a second higher resolution histogram. In various embodiments, the first picture quality adjustment may be a result of inputting the higher resolution histogram or the downsampled version into a tone mapping algorithm.

At 414, method 400 includes filtering the second higher resolution histogram using a low pass filter, as described above in reference to 408. At 416, method 400 may include downsampling the filtered second higher resolution histogram. In some embodiments, the filtered second higher resolution histogram may have too large a resolution for a picture quality improvement algorithm. In other words, a contrast enhancement algorithm for generating a second picture quality adjustment may take as input a histogram with a number of bins that is less than the number of bins of the second higher resolution histogram. For example, the contrast enhancement algorithm may rely on a histogram of 32 bins, whereas the second higher resolution histogram may have 128 bins. As a result, the second higher resolution histogram may be downsampled to generate a lower resolution stable histogram (e.g., a 32-bin histogram with a similar stability profile as the 128 bin, second higher resolution histogram). Downsampling is performed by summing those higher resolution bins that are contained within the lower resolution bin.

At 418, method 400 includes generating a second PQ adjustment to apply to the raw image data based on the filtered second higher resolution histogram or the downsampled filtered second higher resolution histogram. The second PQ adjustment may, in some embodiments, depend on the first PQ adjustment created at 410.

At 420, method 400 includes applying the first picture quality adjustment and the second picture quality adjustment to the raw image data to generate improved image data. In some embodiments, the first picture quality adjustment and the second picture quality adjustment may be applied to the raw image data in series, as described above in reference to FIG. 3A, while in other embodiments, the first picture quality adjustment and the second picture quality adjustment may be combined and applied to the raw image data together, as described above in reference to FIG. 3B. By applying the first and second picture quality adjustments together, the efficiency of the application may be increased and a processing time of the application may be reduced. Each individual application of the PQ adjustment may be accomplished by a lookup table (LUT) or an algorithm. If the first and second PQ adjustments are represented by functions (e.g. LUTs or algorithms) f and g, respectively, then for a given input pixel x, the resulting pixel y after combined application is represented by the composition of f and g:

$$y=(g \circ f)(x)=g(f(x)).$$

Applying the two adjustments at the same time may also reduce quantization errors.

At 422, method 400 includes displaying the improved image data on a display device (such as display device 130) and method 400 ends.

Figure 5:
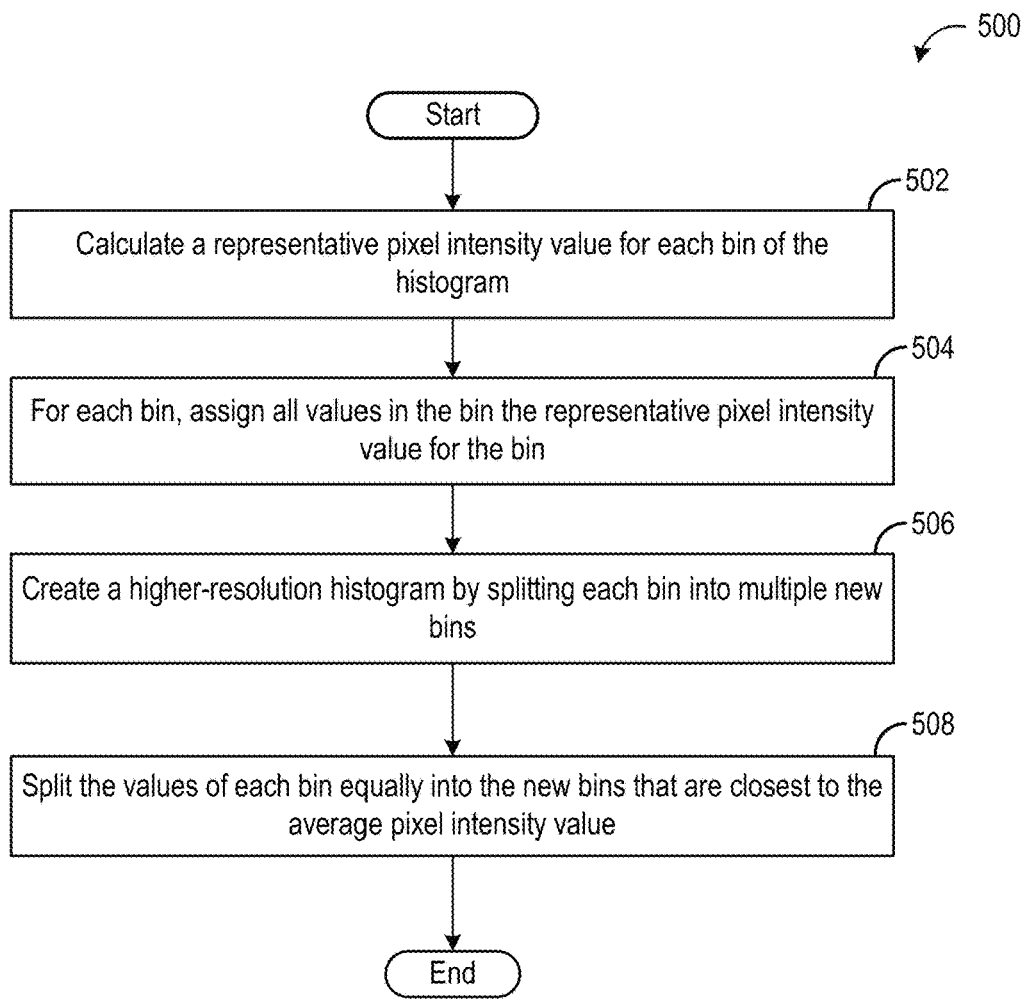
FIG. 5 shows a flow chart illustrating an example method for generating a higher resolution histogram to be used by a picture quality improvement algorithm according to an embodiment of the disclosure.

Turning to FIG. 5, a flowchart is shown illustrating an exemplary method 500 for generating a higher resolution, smoothed histogram of image data in accordance with an embodiment. Method 500 is described with regard to the systems and components of FIG. 1, though it should be appreciated that one or more steps of method 500 may be implemented with other systems and components without departing from the scope of the present disclosure. Method 500 may be implemented as instructions in memory 124, for example, executable by the image processor 120 to perform the actions described herein. In some embodiments, the higher resolution histogram generated by method 500 may be used as input into a tone mapping algorithm to improve a picture quality of images generated from the image data.

Method 500 begins at 502, where method 500 includes calculating a representative pixel intensity value for each bin of the histogram. The representative pixel intensity value may be a pixel intensity value that is representative of a plurality of pixel intensity values assigned to the respective bin. In various embodiments, the representative pixel intensity value may be an average value of the pixel intensity values assigned to the respective bin. In other embodiments, the representative pixel intensity value may be a median pixel intensity value of the pixel intensity values assigned to the respective bin, or the representative pixel intensity value may be calculated or selected based on a different function or method. It should be appreciated that while representative pixel intensity values described herein are average pixel intensity values, other methods for generating a representative pixel intensity value may be used without departing from the scope of this disclosure.

At 504, method 500 includes, for each bin, assigning the representative (e.g. average) pixel intensity value to all the pixel intensity values in the bin. In other words, a bin-averaged histogram is created where a height of each bar of the bin-averaged histogram is the same as the standard histogram, but each bar of the bin-averaged histogram is treated as an impulse on the X axis at the representative of the values in the bin. For example, if 20 pixels are assigned to a first bin, the pixel intensity value of each pixel in the first bin may be averaged to identify the representative pixel intensity value for the first bin. If the average is 6.5, for example, the impulse representing that bin may have a height of 20 (indicating the number of pixels) and may be positioned along the X axis at a value of 6.5.

At 506, method 500 includes creating a higher resolution histogram (e.g., a histogram with more bins/bars) by splitting each bin into a number of new bins. For example, the number may be 4, where each bin of the bin-averaged histogram is divided into 4 new bins. Thus, a shape of the bin-averaged histogram is preserved, but the number of bins of the histogram is a multiple of the original number of bins.

At 508, method 500 includes splitting the values of one or more bins into the two new bins that are closest to the average pixel intensity value, such that an average value (e.g., a center value of a bin) of the two new bins weighted by the number of values in each bin equals the location of the impulse representing the average pixel intensity value of the bin-averaged histogram, as described in greater detail in reference to FIG. 8. In some examples, the values of a bin may be split into two bins when the average pixel intensity value for that bin is within a threshold range of a border between two bins. For example, if an original bin includes pixel values ranging from 0-3 and the original bin is divided into four new bins (ranging from 0-1, 1-2, 2-3, and 3-4) an average pixel intensity value of the original bin is 2, the values may be split into bins 1-2 and 2-3. In contrast, if the average pixel intensity value is in the middle of a bin (e.g., 0.5), the values may be maintained in one bin. Method 500 ends.

FIG. 8 shows an example higher resolution histogram 800 generated from a bin-averaged histogram with 8 bins, including a first bin 802, a second bin 804, a third bin 806, a fourth bin 808, a fifth bin 810, a sixth bin 812, a seventh bin 814, and an eighth bin 816. Each bin of the bin-averaged histogram has been divided into four new bins to generate the higher resolution histogram 800. For example, first bin 802 has been divided into four bins marked from 0 to 3; second bin 804 has been divided into four bins marked from 4 to 7; and so on.

A first high-resolution bin 821 (marked with a 0) of the higher resolution histogram 800 includes a histogram bar 820, which indicates a total number of pixel intensity values assigned to first high-resolution bin 821. The total number of pixel intensity values assigned to first high-resolution bin 821 is equal to a total number of pixel intensity values assigned to first bin 802 of the bin-averaged histogram. As can be inferred from higher resolution histogram 800, the input distribution of pixel intensity values of first bin 802 is centered near a left border of first bin 802, corresponding to first high-resolution bin 821. Thus, by splitting first bin 802 into four new bins, histogram bar 820 may be placed in first bin 802, indicating that the pixel intensity values of first bin 802 were concentrated at the left border of first bin 802, and that fewer or no pixel intensity values of first bin 802 were concentrated at the center and right border of first bin 802. For example, the average bin value for first bin 802 may be 0.5.

In other words, by assigning all the pixel intensity values that fall within first bin 802 the average pixel intensity value for first bin 802, the input distribution of pixel intensity values for first bin 802 was narrowed such that all pixel intensity values of first bin 802 fall within a smaller first high-resolution bin 821 of the higher resolution histogram 800, and not in any other bins of higher resolution histogram 800.

Similarly, a histogram bar 822 shows that the pixel intensity values of second bin 804 of the bin-averaged histogram were concentrated just right of the center of second bin 804 (e.g., with an average bin value of 6.5), and that fewer or no pixel intensity values of first bin 802 were concentrated left of the center of second bin 804; a histogram bar 828 shows that the pixel intensity values of fourth bin 808 of the bin-averaged histogram were concentrated just right of the center of fourth bin 808 (e.g., with an average bin value of 14.5), and that fewer or no pixel intensity values of fourth bin 808 were concentrated left of the center of fourth bin 808; a histogram bar 838 shows that the pixel intensity values of seventh bin 814 of the bin-averaged histogram were concentrated near the right border of seventh bin 814 (e.g., with an average bin value of 27.5), and that fewer or no pixel intensity values of seventh bin 814 were concentrated at the center or at the left border of seventh bin 814; and a histogram bar 840 shows that the pixel intensity values of eighth bin 816 of the bin-averaged histogram were concentrated near the left border of eighth bin 816 (e.g., with an average bin value of 28.5), and that fewer or no pixel intensity values of eighth bin 816 were concentrated at the center or at the right border of eighth bin 816.

In first bin 802, second bin 804, fourth bin 808, seventh bin 814, and eighth bin 816, the input distributions of pixel intensity values were such that the average pixel intensity values fell within a single higher resolution bin. For example, the average pixel intensity value of first bin 802 fell within first high-resolution bin 821. However, in some cases, the average pixel intensity value of a bin of the bin-averaged histogram may fall at a border between two smaller bins of the higher resolution histogram. For example, the average pixel intensity value of third bin 806 of the bin-averaged histogram fell at a border 825 between a high-resolution bin 823 and a high-resolution bin 827 of the higher resolution histogram 800. As a result of the average pixel intensity value of third bin 806 of the bin-averaged histogram falling on or within a threshold distance of border 825, an initial histogram bar (not shown in FIG. 8) of third bin 806 has been split between the two closest bins of the higher resolution histogram, meaning high-resolution bin 823 and high-resolution bin 827. For example, the average bin value for the third bin 806 may be 11, with half of the pixels being positioned into bin 823 with an average bin value of 10.5 and the other half being positioned into bin 827 with an average bin value of 11.5.

By splitting the initial histogram bar into two, a stability of the higher resolution histogram 800 may be increased. For example, a situation could occur in which in a first image frame of two consecutive image frames, the average pixel intensity value of third bin 806 falls into high-resolution bin 823, and in a second image frame of the two consecutive image frames, the average pixel intensity value of third bin 806 falls into high-resolution bin 827. If the higher resolution histogram 800 included a single histogram bar at high-resolution bin 823 for the first image frame, and a single histogram bar at high-resolution bin 827 for the second image frame, a picture quality improvement algorithm (e.g., a tone mapping algorithm) may generate a flash or similar visual distortion between a display of the first image frame and the second image frame.

In other cases, as seen in fifth bin 810 and sixth bin 812 of the higher resolution histogram 800, the average pixel intensity value of a bin of the bin-averaged histogram may not fall on a border between two bins of the higher resolution histogram 800, but may fall close to a border. In such cases, the pixel intensity values may be allocated differently between bordering bins as described above, such that the average values (e.g., a center value of a bin) of the two bordering bins of the higher resolution histogram weighted by the number of values in each bin equals the average pixel intensity value of the bin-averaged histogram.

For example, the allocation of samples may be calculated as follows:

$$\text{int}V = \text{floor}(\text{avgValue});$$

$$\text{frac}V = \text{avgValue} - \text{int}V;$$

$$\text{tradBin}(\text{int}V) = (1 - \text{frac}V)^* \text{avgBinHistNum}(N);$$

$$\text{tradBin}(\text{int}V+1) = \text{frac}V^* \text{avgBinHistNum}(N);$$

where avgValue=bin-averaged histogram value for bin $N$ tradBin=bin in a standard histogram avgBinHistNum($N$)=number of samples (e.g., pixel intensity values) in the average histogram for bin $N$.

Thus, if the average pixel intensity value of fifth bin 810 of the bin-averaged histogram fell close to a border 831 between a high-resolution bin 829 and a high-resolution bin 833 of the higher resolution histogram 800, an initial histogram bar (not shown in FIG. 8) of fifth bin 810 has been split between the two closest bins of the higher resolution histogram, meaning high-resolution bin 829 and high-resolution bin 833, in accordance with the logic described above. As a result, a shorter histogram bar 830 may be generated for high-resolution bin 829, and a longer histogram bar 834 may be generated for high-resolution bin 833, such that the average pixel intensity values of high-resolution bin 829 and high-resolution bin 833 weighted by the number of values in high-resolution bin 829 and high-resolution bin 833 equals the average pixel intensity value of the fifth bin 810. In the specific example shown in FIG. 8, the average pixel intensity value for fifth bin 810 may be 19.25, which is not on a border but is within a threshold range of the border. The two nearest bins may be identified based on the floor of the average pixel intensity value (e.g., 18-19, and 19-20). The fractional amount of the average value (e.g., 0.25) may then be used to weight the distribution of the pixel values such that 25% of the pixel values are allocated to bin 829, resulting in an average value for bin 829 of 18.5, and 75% of the pixel values (1-0.25) are allocated to bin 833, resulting in an average value for bin 833 of 19.5. For bins having average pixel intensity values that fall in the middle of a bin (e.g., 0.5 as in the first bin and 6.5 as in the second bin), the two nearest bins are the same bin and all the pixels are allocated to that bin. Hence the reallocation of the pixels once the histogram is split into the higher resolution histogram may be selective, in that some bins may maintain all the pixels in one of the new bins, rather than split into two new bins.

Additionally, in some embodiments, the bin-averaged histogram may store a fractional value of an input distribution relative to a start of a range of the histogram bin, whereby intV may be calculated as:

$$intV = \text{floor}(avgValue) + W*N;$$

where W is the width of the histogram bin and N is the bin number. IntV may be calculated in this manner when adjusting a resolution of a histogram from an upsampled (e.g., higher resolution) and filtered histogram to a histogram resolution required for a picture quality algorithm, as described in reference to method 400 of FIG. 4. The curve 850 represents the results of low-pass filtering of the higher resolution histogram 800. The low-pass filter serves to smooth out the histogram, creating a distribution which is less sensitive to small changes in the input distribution.

Thus, systems and methods are presented for processing digital image data in real time for display on a display device, in a manner that reduces the latency while increasing image quality. Visual artifacts such as flashing that may occur as a result of changes in an input distribution of pixel intensity values over a sequence of image frames may be reduced by creating a stable histogram that has an increased tolerance to minor changes in the pixel intensity values, particularly in areas of an image where variance between brightness and/or tonal values is low. As described herein, the stable histogram may be created from image data by averaging pixel intensity values in each bin of a histogram, and upsampling the average pixel intensity values to a plurality of smaller bins of a higher resolution histogram in a way that spreads the pixel intensity values over more bins. The higher resolution histogram may be filtered with a low pass filter to further smooth the higher resolution histogram, resulting in a histogram that may be used to generate a plurality of picture quality adjustments via various algorithms without generating visual artifacts.

Put another way, a pixel distribution algorithm is disclosed that may be applied to a first histogram of the digital image with a first input distribution. The pixel distribution algorithm may change the first input distribution to a second, smoother input distribution to generate a second histogram of the digital image. The second, more stable histogram may be used as input into a picture quality adjustment algorithm such as a tone mapping algorithm to improve a quality of the digital image.

Additionally, latency issues that arise when applying a sequence of picture quality adjustments to raw image data may be at least partially due to having to create a new image histogram from the raw image data each time a picture quality adjustment is applied. As described herein, picture quality adjustments may be applied, in sequence or in combination, without having to generate new histograms after each picture quality adjustment is applied, thereby reducing latency problems resulting from image processing.

Further still, in addition to providing for cascading picture quality algorithms, the approach described herein also advantageously allows a histogram to be modified to change a behavior of a picture quality algorithm. For example, a contrast enhancement algorithm may use a histogram equalization approach, whereby a tone map may be made using a cumulative histogram that is applied to image data. However, the contrast enhancement algorithm may change a distribution of the pixel values in the image into one that is close to a uniform distribution, where an ideal distribution for a typical image may be Gaussian. As a result, the contrast enhancement algorithm may have to be modified to preserve the distribution. To avoid having to modify the contrast enhancement algorithm, in accordance with the systems and methods disclosed herein, tone mapping may be applied to the histogram data before using the histogram in the contrast enhancement algorithm. The tone mapping may be designed such that an "ideal" distribution for the output of the contrast enhancement algorithm is converted to a uniform distribution.

One method of contrast enhancement is histogram equalization. In this method, the original histogram is used to create a cumulative histogram. The cumulative histogram is a curve which can be used to map the input image data to an output. However, if the histogram has very sharp spikes or is not very even, this technique may yield poor results. If instead a tone map is first applied to the filtered histogram before calculating the cumulative histogram, the histogram can be flattened more, leading to more desirable results when applying histogram equalization.

The technical effect of applying the methods described herein to generate an image histogram with increased stability is that visual artifacts generated by minor variations in input distributions may be reduced, and that the histogram may be used by a plurality of picture quality improvement algorithms in sequence, thereby reducing latency during real time image processing of a digital image.

The disclosure also provides support for a method for processing a digital image, comprising: generating a higher resolution histogram from the digital image, the higher resolution histogram generated from a lower resolution histogram of raw image data, filtering the higher resolution histogram, downsampling the filtered, higher resolution histogram to form a downsampled histogram, generating one or more picture quality adjustments based on the downsampled histogram, applying the one or more picture quality adjustments to the raw image data of the digital image to generate an improved digital image, the improved digital image having a higher picture quality than the digital image, and displaying the improved digital image on a display device. In a first example of the method, one or more picture quality adjustments include a tone-mapping operation. In a second example of the method, optionally including the first example, the method further comprises generating the lower resolution histogram by assigning each pixel of the raw image data to a bin of a plurality of bins of the lower resolution histogram; for each bin of the histogram, calculating a representative pixel intensity value of pixel intensity values assigned to that bin, and assigning the representative pixel intensity value to each pixel in the bin. In a third example of the method, optionally including one or both of the first and second examples, generating the higher resolution histogram from the lower resolution histogram includes, for each bin of the lower resolution histogram: splitting that bin into two or more new bins to create the higher resolution histogram, and selectively reallocating pixels from that bin of the lower resolution histogram to two new bins of the higher resolution histogram, the two new bins having pixel intensity value ranges closest to the representative pixel intensity values of that bin. In a fourth example of the method, optionally including one or more or each of the first through third examples, the representative pixel intensity value is an average pixel intensity value. In a fifth example of the method, optionally including one or more or each of the first through fourth examples, selectively reallocating the pixel intensity values further includes adding the assigned pixel intensity values to any previously assigned pixel intensity values. In a sixth example of the method, optionally including one or more or each of the first through fifth examples, filtering the higher resolution histogram includes passing data of the higher resolution histogram through a low-pass filter. In a seventh example of the method, optionally including one or more or each of the first through sixth examples, applying the plurality of picture quality adjustments to the raw image data of the digital image to generate the improved digital image further comprises: performing a first image processing operation on the downsampled histogram to generate a first picture quality adjustment, applying the first picture quality adjustment to a previously generated histogram (e.g., the higher resolution histogram or the downsampled histogram) to create a second histogram, performing a second image processing operation on the second histogram, to generate a second picture quality adjustment, applying the first picture quality adjustment and the second picture quality adjustment to the raw image data to generate an improved digital image. In an eighth example of the method, optionally including one or more or each of the first through seventh examples, a histogram is not generated from image data resulting from applying a picture quality adjustment to the raw image data. In a ninth example of the method, optionally including one or more or each of the first through eighth examples, applying the first picture quality adjustment and the second picture quality adjustment to the raw image data to generate the improved digital image further comprises one of: applying the first picture quality adjustment and the second picture quality adjustment to the raw image data sequentially, and combining the first picture quality adjustment and the second picture quality adjustment and applying the combined picture quality adjustment to the raw image data.

The disclosure also provides support for a system, comprising: an image processing system including one or more processors and instructions stored in non-transitory memory, that when executed cause the one or more processors to: receive raw image data from an image acquisition device of the image processing system, generate a lower resolution histogram from the received raw image data, apply a first histogram adjustment algorithm to the lower resolution histogram to generate a higher resolution histogram, calculate a first tone mapping adjustment to apply to the raw image data based on the higher resolution histogram, apply the first tone mapping adjustment to the higher resolution histogram or the lower resolution histogram (which may be a bin-averaged histogram) to generate a second higher resolution histogram, calculate a second tone mapping adjustment to apply to the raw image data based on the second higher resolution histogram, apply the first tone mapping adjustment and the second tone mapping adjustment to the raw image data to generate an improved digital image, and display the improved digital image on a display device of the image processing system. In a first example of the system, applying the first histogram adjustment algorithm to the lower resolution histogram to generate a higher resolution histogram further comprises: calculating a representative pixel intensity value for each bin of the lower resolution histogram, assigning all pixel intensity values of each bin of the lower resolution histogram the representative pixel intensity value, splitting each bin of the lower resolution histogram into a number of new bins to generate the higher resolution histogram, and applying a filter to the upsampled higher resolution histogram. In a second example of the system, optionally including the first example, the number of new bins that each bin of the lower resolution histogram is split into is two or more bins. In a third example of the system, optionally including one or both of the first and second examples, splitting each bin further includes allocating a portion of the pixel intensity values of that bin into a new bin of the number of new bins, the new bin having a pixel intensity value range closest to the representative pixel intensity value of that bin. In a fourth example of the system, optionally including one or more or each of the first through third examples, applying the first tone mapping adjustment and the second tone mapping adjustment to the raw image data to generate an improved digital image further comprises: applying the first tone mapping adjustment to the raw image data to generate adjusted image data, and applying the second tone mapping adjustment to the adjusted image data. In a fifth example of the system, optionally including one or more or each of the first through fourth examples, applying the first tone mapping adjustment and the second tone mapping adjustment to the raw image data to generate an improved digital image further comprises: combining the first tone mapping adjustment and the second tone mapping adjustment to generate a combined tone mapping adjustment, and applying the combined tone mapping adjustment to the raw image data.

The disclosure also provides support for a method for improving a quality of a digital image, comprising: generating a first histogram of the digital image with a first input distribution, applying a pixel distribution algorithm that changes the first input distribution to a second input distribution to generate a second histogram of the digital image, using the second histogram as input into a picture quality adjustment algorithm to generate a picture quality adjustment, applying the picture quality adjustment to the digital image to generate a digital image with improved quality, and displaying the digital image with improved quality on a display device. In a first example of the method, the picture quality adjustment algorithm is a tone mapping algorithm. In a second example of the method, optionally including the first example, generating the first histogram includes: for each bin of the first histogram: generating a representative pixel intensity value of a number of samples of pixel intensity values of the bin, assigning all the samples of the bin the representative pixel intensity value, subdividing the bin into a number of new bins, allocating the samples of the bin to one or more of the new bins, the one or more new bins having pixel intensity value ranges closest to the representative pixel intensity value. In a third example of the method, optionally including one or both of the first and second examples, the method further comprises: filtering the first histogram using a low pass filter. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for processing a digital image comprising:
   generating a higher resolution histogram from the digital image, the higher resolution histogram generated from a lower resolution histogram of raw image data of the digital image;
   filtering the higher resolution histogram;
   downsampling the filtered, higher resolution histogram to form a downsampled histogram;
   generating one or more picture quality adjustments based on the downsampled histogram;
   applying the one or more picture quality adjustments to the raw image data of the digital image to generate an improved digital image, the improved digital image having a higher picture quality than the digital image;
   displaying the improved digital image on a display device; and
   generating the lower resolution histogram by:
      assigning each pixel of the raw image data to a bin of a plurality of bins of the lower resolution histogram; and
      for each bin of the lower resolution histogram:
         calculating a representative pixel intensity value of pixel intensity values assigned to that bin; and
         assigning the representative pixel intensity value to each pixel in that bin.

2. The method of claim 1, wherein generating the higher resolution histogram from the lower resolution histogram includes, for each bin of the lower resolution histogram:
   splitting that bin into two or more new bins to create the higher resolution histogram; and
   selectively reallocating pixels from that bin of the lower resolution histogram to two new bins of the higher resolution histogram, the two new bins having pixel intensity value ranges closest to the representative pixel intensity values of that bin.

3. The method of claim 1, wherein the representative pixel intensity value is an average pixel intensity value.

4. The method of claim 1, wherein selectively allocating the pixel intensity values further includes adding the assigned representative pixel intensity values to any previously assigned pixel intensity values.

5. The method of claim 1, wherein filtering the higher resolution histogram includes passing data of the higher resolution histogram through a low-pass filter.

6. A method for processing a digital image claim 1, comprising:
   generating a higher resolution histogram from the digital image, the higher resolution histogram generated from a lower resolution histogram of raw image data of the digital image;
   filtering the higher resolution histogram;
   downsampling the filtered, higher resolution histogram to form a downsampled histogram;
   generating one or more picture quality adjustments based on the downsampled histogram;
   applying the one or more picture quality adjustments to the raw image data of the digital image to generate an improved digital image, the improved digital image having a higher picture quality than the digital image; and
   displaying the improved digital image on a display device, wherein
   applying the one or more picture quality adjustments to the raw image data of the digital image to generate the improved digital image further comprises:
      performing a first image processing operation on the downsampled histogram to generate a first picture quality adjustment;
      applying the first picture quality adjustment to a previously created histogram to create a second histogram;
      performing a second image processing operation on the second histogram, to generate a second picture quality adjustment; and
      applying the first picture quality adjustment and the second picture quality adjustment to the raw image data to generate an improved digital image.

7. The method of claim 6, wherein a histogram is not generated from image data resulting from applying a picture quality adjustment to the raw image data.

8. The method of claim 6, wherein applying the first picture quality adjustment and the second picture quality adjustment to the raw image data to generate the improved digital image further comprises one of:
   applying the first picture quality adjustment and the second picture quality adjustment to the raw image data sequentially; and
   combining the first picture quality adjustment and the second picture quality adjustment to form a combined picture quality adjustment and applying the combined picture quality adjustment to the raw image data.

9. A method for improving a quality of a digital image, comprising:
   generating a first histogram of the digital image with a first input distribution;
   applying a pixel distribution algorithm that changes the first input distribution to a second input distribution to generate a second histogram of the digital image;

using the second histogram as input into a picture quality adjustment algorithm to generate a picture quality adjustment;

applying the picture quality adjustment to the digital image to generate a digital image with improved quality; and displaying the digital image with improved quality on a display device, wherein the generating the first histogram includes:

for each bin of the first histogram:
  generating a representative pixel intensity value of a number of samples of pixel intensity values of the bin;
  assigning all the samples of the bin the representative pixel intensity value;
  subdividing the bin into a number of new bins; and
  allocating the samples of the bin to one or more of the new bins, the one or more the new bins having pixel intensity value ranges closest to the representative pixel intensity value.

10. The method of claim 9, further comprising filtering the first histogram using a low pass filter.

* * * * *